(No Model.) 3 Sheets—Sheet 1.

E. THOMSON & G. H. ALTON.
INCANDESCENT LAMP SOCKET.

No. 428,652. Patented May 27, 1890.

Witnesses
Ira R. Steward
J. W. Gibboney

Inventors
Elihu Thomson and
George H. Alton
By their Attorney
H. L. Townsend

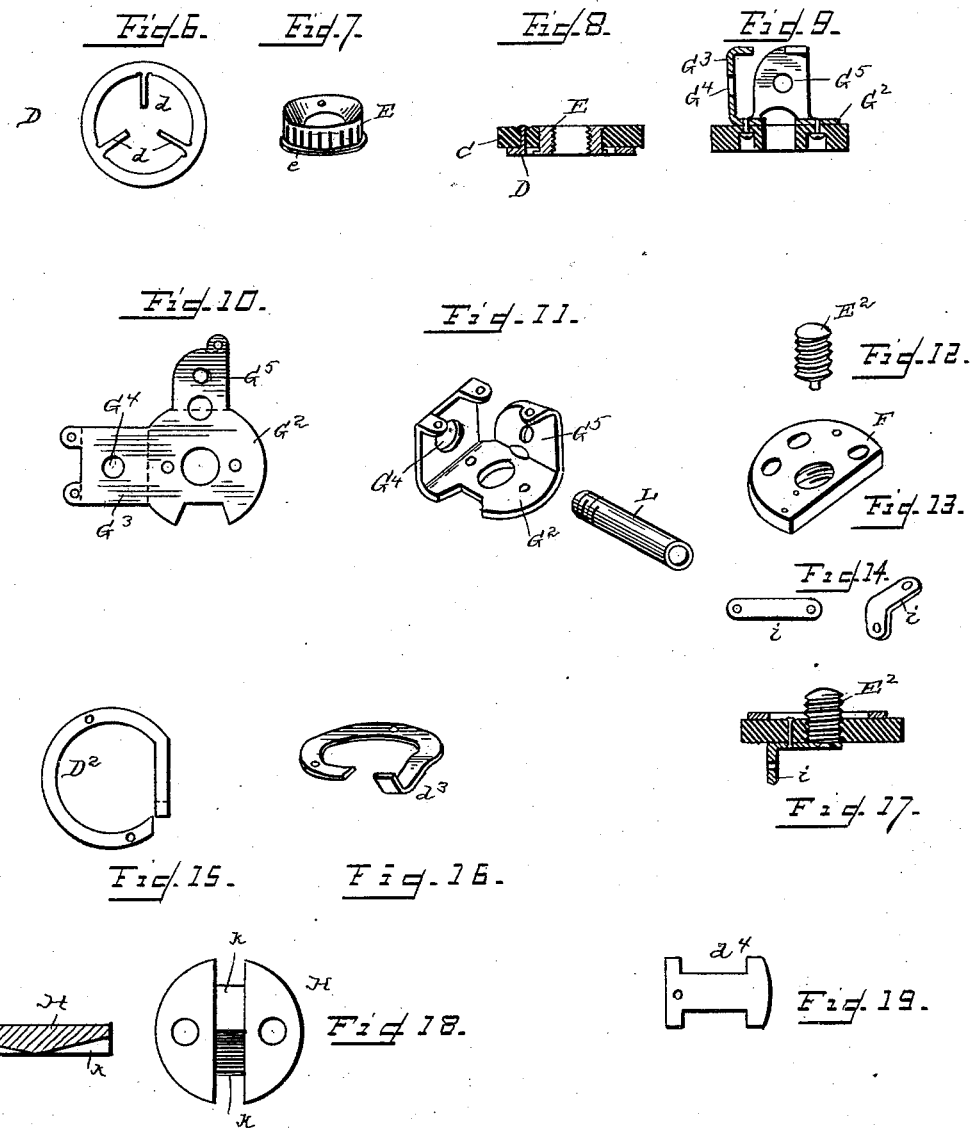

(No Model.) 3 Sheets—Sheet 3.
E. THOMSON & G. H. ALTON.
INCANDESCENT LAMP SOCKET.
No. 428,652. Patented May 27, 1890.
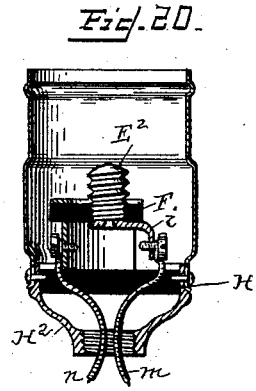
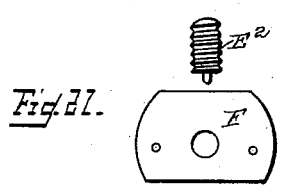
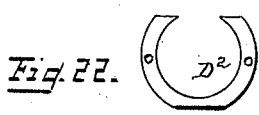
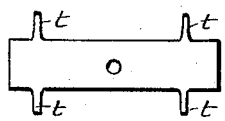
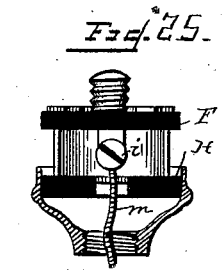
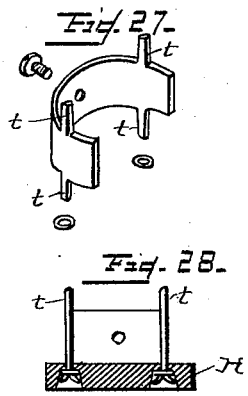
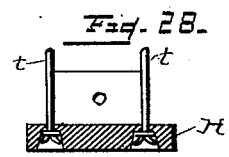
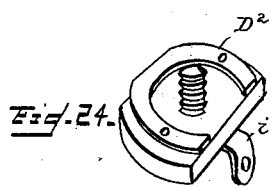
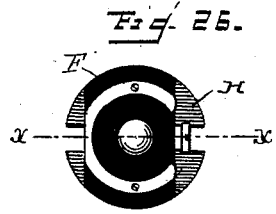

UNITED STATES PATENT OFFICE.

ELIHU THOMSON AND GEORGE H. ALTON, OF LYNN, MASSACHUSETTS, ASSIGNORS TO THE THOMSON-HOUSTON ELECTRIC COMPANY, OF CONNECTICUT.

INCANDESCENT-LAMP SOCKET.

SPECIFICATION forming part of Letters Patent No. 428,652, dated May 27, 1890.

Application filed January 17, 1889. Serial No. 296,679. (No model.)

*To all whom it may concern:*

Be it known that we, ELIHU THOMSON and GEORGE H. ALTON, citizens of the United States, and residents of Lynn, in the county of Essex and State of Massachusetts, have invented a certain new and useful Incandescent Lamp and Socket or Holder therefor, of which the following is a specification.

Our invention relates to the construction of the sockets or holders for incandescent lamps and a means for making the electrical connection between the leading-in wires attached to said socket or holder and the carbon filament or other light-giving portion of the lamp.

Our invention consists in certain improved details of construction and combinations of parts relating to the contact terminals on the lamp and in the socket or holder, to the manner of mounting the switch in the socket, and to other details of construction and combinations of parts that will be described in connection with the accompanying drawings, and then more particularly stated in the claims.

Figure 1:
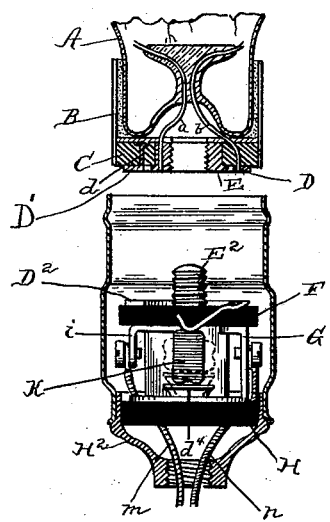
Figure 2:
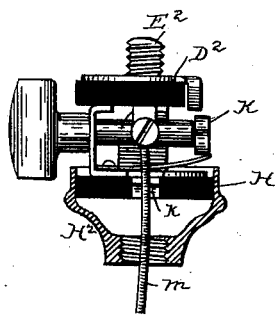
Figure 3:
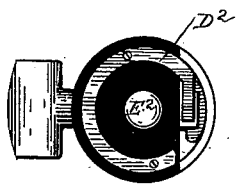
Figure 4:
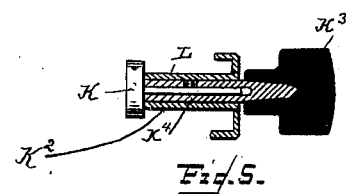
Figure 5:
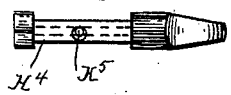

In Figure 1 of the accompanying drawings we have shown in side elevation the parts of a lamp socket or holder embodying our invention and in vertical section the neck and attached electrodes of an incandescent lamp adapted to be attached to the socket or holder and to be thereby placed in electrical connection with the wires or circuit leading to said holder. Fig. 2 is an edge view of the parts of the lamp-support, the view being taken at right angles to that of Fig. 1. Fig. 3 is a plan of the lamp-support from above. Fig. 4 is a longitudinal section of the combined switch-spindle. Fig. 5 is a plan of the same. Fig. 6 is a plan of a blank which may be used in forming one of the contact terminals of the lamp. Fig. 7 is a perspective view of a form of blank adapted for use in making the other contact terminal. Fig. 8 is a cross-section through the contact terminals at the base of the lamp. Fig. 9 is a vertical section through the metal frame and insulating base-block in the socket or holder of the lamp. Fig. 10 is a plan of a form of metal blank suitable for use in constructing said frame. Fig. 11 shows in perspective the frame and the metal tube adapted for attachment thereto and forming the socket or sleeve for the rotary switch. Fig. 12 shows a screw contact terminal adapted for attachment to an insulating plate or block, such as shown in Fig. 13 in perspective. Fig. 14 shows (detached) the arm or extension from said screw-contact electrode as it appears in the form of a blank and after bending. Fig. 15 shows one of the contact terminals of the lamp holder or support in the form of a blank. Fig. 16 shows the blank bent to the form which it has in the completed socket or holder. Fig. 17 is a vertical cross-section through the parts Figs. 12, 13, and 14 when assembled. Fig. 18 is a plan of a supporting base-plate for the frame of the socket or holder, looking from beneath. Fig. 19 is a plan of a contact-spring used in connection with the switch of the socket or holder. Fig. 20 is a vertical section through a holder having a frame of modified form adapted for use when no switch is employed with the holder. Fig. 21 is a side elevation of the contact terminal of Fig. 20 and a plan of the insulating-block in which it sets. Fig. 22 is a plan of the other contact terminal of said holder. Fig. 23 is a plan of a blank used as the metal-support for the insulating-rod. Fig. 24 is a perspective view of the contact terminals of the socket or holder in place. Fig. 25 is a side elevation of the holder, Fig. 20, taken at right angles. Fig. 26 is a plan of the socket or holder, Fig. 20. Fig. 27 is a perspective view of the frame or metal support made from the blank, Fig. 23. Fig. 28 shows said frame as secured to the insulating base or washer.

Referring to Fig. 1, A indicates the neck or base of an incandescent electric lamp cemented in the metal collar E. To said collar is secured an insulating block or washer C, made of vulcanized fiber or other insulating material and carrying the contact terminals for the lamp.

D D' indicate, respectively, the two contact terminals. Terminal D consists of a plate in the form preferably of a ring adapted to engage with and make contact upon the corresponding terminal D² of the socket or holder. The plate or ring D is secured in place by arms or extensions $d$, passing up through the washer C and fastened on the upper side by riveting or otherwise. The arms $d$ are preferably made in one piece with the contact-plate D. A blank suitable for this contact terminal is shown in Fig. 6, and consists of the ring D, with the ears or projections $d$ extending radially inward from the same. This blank may be stamped out of a piece of metal and the ears $d$ turned up at right angles to the ring D and pass through the opening bored in the washer C when the plate is to be fastened to the lamp-base.

The contact terminal E is in the form of a bushing having an internal screw-thread adapted to engage with and screw upon a screw-threaded contact terminal E² of the socket or holder.

The terminal E is eyeleted into a central opening in the washer C, and for this purpose is constructed in the form shown in Fig. 7, with a shoulder $e$ at one end and with a taper or reduced opposite end, which can be turned down or bent over like an eyelet after the bushing has been inserted in the opening in C. After insertion, and having been secured in place, the screw-thread on its interior is formed. One of the lamp-wires $a$ is secured to the electrode E, and the other $b$ to the electrode D. The wire $a$ passes through a perforation bored vertically through the bushing E, so as to bring the wire to the outer or lower surface of the bushing, where it may be secured by solder or otherwise. The wire $b$ passes through a similar opening in the washer C and in the ring-electrode D. The two contact terminals or electrodes are shown fastened in place in section in Fig. 8.

The contact terminals E² D² of the socket or support are carried by an insulating block or washer F, of vulcanized fiber or other suitable material, which is fastened on the top of a metal frame G. The base of the frame G fastens to an insulating block or washer H, that is secured in a screw-threaded metal terminal H², adapted to be attached to the end of a pipe, through which the leading-in wires $m$ $n$ are passed for attachment to the lamp socket or support. One of the wires $m$ is attached to an extension $i$ from the screw-contact E². The extension $i$ is fastened to the plate F by riveting or upsetting the end of the screw-contact E² after passing such end through a perforation in the plate $i$, as shown more clearly in Fig. 17.

The frame G, of metal, is made in one piece and from a blank, such as shown in Fig. 10. The base of the frame G² has an arm or extension G³, which forms one of the uprights or standards of said plate, and has an opening G⁴, for a purpose to be presently described. A second arm or extension G⁵, to form an additional standard, may also be used. At the ends of said arms are formed ears or projections perforated as indicated, and which may be turned over into the position shown in Fig. 11 to form supports for the washer F and to receive screws or rivets for fastening said washer in position. The ends of these screws or rivets being in position beneath the plate D² are preferably covered with some insulating-cement. The base G² is fastened to the plate H, of insulating material, in any suitable manner, and one of the leading-in wires $m$ is fastened to the standard or upright G⁵.

To facilitate the introduction of the wires into position for fastening, the bottom of the washer or plate H is formed with the inclined guide grooves or ways, such as indicated at $k$, Fig. 18.

The contact-screw E² is fastened into the plate F by screwing it in or by other desired means.

The contact-terminal plate D² is formed from a blank such as indicated in Fig. 15, which blank has one end $d^3$ bent downward, as shown in Fig. 16 and in Fig. 1, to form a spring-contact for an electric switch of any desired description. The form of switch here shown consists of a rotary spindle having a metal head K, adapted to be rotated between the spring $d^3$ and another spring $d^4$, secured to the base G² of the metal frame. The head K has a notch at each end, as indicated, adapted to receive the bent end of the spring $d^3$. The spring $d^4$ being flat at its contact-surface, and the bend in the spring $d^3$ being of suitable form to enter the notches in the head K, the switch will be held in circuit-closing position. The switch is preferably a rotary switch, and is mounted in a tubular socket L, Fig. 4, which may be fastened in the opening G⁴, Fig. 10, in the metal frame. The metal head K is fastened at one end of a compound spindle K², provided with a turn-button K³, Fig. 4. The button is secured to a sleeve K⁴, into which enters a pin extending from the head K. A stud K⁵ projects laterally from the pin K⁴ into an opening somewhat larger than the stud formed in the side of the sleeve to which the metal K³ is secured. By this means a certain amount of lost motion between the head K and the button K³ is permitted, so that when the head is turned to bring the springs $d^4$ against the rounded corners of the head the springs will be permitted to constantly throw the head in the position shown in dotted lines, Figs. 1 and 2, thereby quickly breaking the connection and producing what is known as a "snapping action" of the switch.

When it is not desired to use a switch in connection with the socket, the contact terminal D² may be made in the form shown in Fig. 22. The screw-contact E² may be attached to a washer F in the manner already described, and may have an arm or extension for attachment of a leading-in wire, as already explained. The supporting metal frame of the upper contact-block may in this case be conveniently made from a blank, such as indicated in Fig. 6, having the four ears or projections t.

The plate, Fig. 23, may be bent into the form shown in Fig. 27 to form a supporting-frame adapted for attachment to the washers or blocks F H. The attachment may be made in the manner indicated in Fig. 28 by passing the ears t through openings in the insulating-blocks and through washers, and then spreading or splitting the ends of the ears t or riveting.

When the lamp is screwed upon its holder, the circuit from wire $m$ will be completed through the same if the switch be closed by the path $i$ $E^2$ E, lamp-wire $a$, and out by wire $b$, contact terminal D, contact terminal $D^2$, switch-frame G, and to wire $n$. On turning the handle $k^3$ the circuit of the lamp will be broken at the conducting-head K, which leaves contact with the bent spring $d^3$.

The switch may be turned in either direction, as will be obvious, to effect either the breaking or the closing of the circuit.

What we claim as our invention is—

1. In an electric-lamp support, the combination, with the intermediate metallic frame made in one piece, of the two attached insulating-pieces, a contact terminal mounted on the upper block and having a spring forming a switch-spring, a switch-spring mounted on the other block and in connection with the frame, and an intermediate rotary connecting-piece rotatable between said springs into and out of connection with the same and borne by a horizontal spindle mounted in the upright or standard of the frame.

2. An electric-lamp base having a contact terminal composed of a screw-threaded bushing eyeleted in a non-conducting washer secured to the lamp-collar.

3. The lamp contact terminal consisting of an eyeleted bushing having a perforation extending through it to receive a lamp-wire, as and for the purpose described.

4. In an electric-lamp support, the combination of a metallic frame of a single piece of metal having means for attachment of one of the leading-in wires, two insulating washers or plates fastened, respectively, to the top and bottom of the frame, two contact terminals secured to the upper plate and adapted to be engaged by contacts carried by the lamp, a switch-contact spring and means for attachment of a leading-in wire in connection, respectively, with said terminals, and a rotary contact mounted in the metallic frame and arranged to rotate into and out of contact with the said switch-contact spring.

5. In an electric-lamp support, the combination, with the metallic frame made in one piece, of the insulating-plate mounted thereon and carrying a contact terminal, a switch-contact spring connected with the said terminal, a second switch-contact spring fastened to the base of the frame, a sleeve or bushing extending transversely from the metal frame, and a switch-spindle mounted thereon and having a rotatable metal head between the two contact-springs, as and for the purpose described.

6. In an electric-lamp support, the combination, with a metal frame made in one piece and fastened on a suitable support, of a switch-contact terminal secured to the base of the frame, a second switch-contact terminal secured to the top of the frame but insulated therefrom, a horizontal sleeve attached to the upright portion of the frame, a lamp-switch spindle borne in said sleeve and extending transversely between the two contact terminals, and a rotatable switch-contact rotated by said spindle into and out of contact with said terminals, as and for the purpose described.

7. The combination, with the insulating plate or washer, of the metal bushing eyeleted therein and having an internal screw-thread adapted to engage with a screw-contact terminal.

Signed at Lynn, in the county of Essex and State of Massachusetts, this 9th day of January, A. D. 1889.

ELIHU THOMSON.
GEORGE H. ALTON.

Witnesses:
J. W. GIBBONEY,
D. M. BARTON.